(12) United States Patent
Jouta et al.

(10) Patent No.: US 8,764,063 B2
(45) Date of Patent: Jul. 1, 2014

(54) STEERING DEVICE

(75) Inventors: Masaya Jouta, Maebashi (JP); Satoru Nagasawa, Maebashi (JP)

(73) Assignee: NSK Ltd., Shinagawa-ku, Tokyo (JP)

( * ) Notice: Subject to any disclaimer, the term of this patent is extended or adjusted under 35 U.S.C. 154(b) by 0 days.

(21) Appl. No.: 13/352,884

(22) Filed: Jan. 18, 2012

(65) Prior Publication Data

US 2012/0193901 A1    Aug. 2, 2012

(30) Foreign Application Priority Data

Jan. 19, 2011 (JP) .................. 2011-008491
Jun. 14, 2011 (JP) .................. 2011-132161
Jun. 27, 2011 (JP) .................. 2011-141528
Oct. 31, 2011 (JP) .................. 2011-239674

(51) Int. Cl.
    *B62D 1/19*         (2006.01)
    *B62D 1/185*       (2006.01)
    *B62D 7/22*         (2006.01)

(52) U.S. Cl.
    CPC ............ *B62D 1/185* (2013.01); *B62D 1/192* (2013.01); *B62D 7/224* (2013.01)
    USPC ............................ 280/775; 280/777; 74/493

(58) Field of Classification Search
    CPC ........ B62D 1/192; B62D 1/195; B62D 1/197; B62D 1/19; B62D 1/185; B62D 1/18; B62D 1/16; B62D 7/224; F16C 2326/24
    USPC ............. 280/775, 777, 771; 180/271; 74/493, 74/492
    See application file for complete search history.

(56) References Cited

U.S. PATENT DOCUMENTS

| | | | |
|---|---|---|---|
| 7,220,056 B2 * | 5/2007 | Kubota et al. | 384/215 |
| 7,455,320 B2 * | 11/2008 | Imamura et al. | 280/777 |
| 7,665,747 B2 * | 2/2010 | Arlt | 280/93.514 |
| 8,272,785 B2 * | 9/2012 | Hirose et al. | 384/215 |
| 2007/0137378 A1 * | 6/2007 | Bastein et al. | 74/493 |

FOREIGN PATENT DOCUMENTS

| | | |
|---|---|---|
| JP | 1997(H09)-303387 | 11/1997 |
| JP | 2005-054853 | 3/2005 |
| JP | 2005-0535292 | 3/2005 |

* cited by examiner

*Primary Examiner* — Keith Frisby
(74) *Attorney, Agent, or Firm* — Crowell & Moring LLP

(57) ABSTRACT

A steering device contains a rolling bearing that axially supports a steering shaft to allow rotation, and whose upper column and lower column engage along the axis in a sliding motion in order to provide improved steering wheel operating stability during high-speed driving. The elastic force of an O-ring tightens the outer circumferential surface of a female steering shaft against the cylindrical surface of a bushing. A specific frictional force therefore occurs between the cylindrical surface of the bushing and the outer circumferential surface of the female steering shaft so that handling stability of the steering wheel during high-speed driving is improved. Moreover, vehicle vibrations are prevented from being conveyed to the steering wheel by the O-ring crushed due to the pressing force of the inner circumferential surface of the first lower column and that absorbs the vibration of the female steering shaft.

18 Claims, 13 Drawing Sheets

STEERING DEVICE

BACKGROUND

The present invention relates to a steering device, and relates in particular to a telescoping type steering device to telescopically adjust the position of the steering wheel by way of an upper column and a lower column that engage along the axis in a sliding motion; or a steering device to absorb the impact load during a secondary collision by way of a collapsing movement towards the front of the vehicle chassis, and also a steering device including a rolling bearing to axially support a rotatable steering shaft.

The rolling bearing axially supporting the rotatable steering shaft has low frictional resistance and this frictional resistance is stable so that the steering wheel operation is very smooth. The roller bearing however possesses a small vibration absorption characteristic so vibrations in the wheel axis due to bumps on the road surface during high-speed driving are transmitted unchanged to the steering wheel, to cause tiny vibrations along the upward/downward and rotational directions of the steering wheel so the roller bearing has the problem that handling stability becomes worse.

The steering device in Japanese Unexamined Patent Application Publication No. Hei9(1997)-303387 applies frictional resistance to the steering shaft by mounting a plain bearing via an elastic piece between the inner circumferential surface of the column and outer circumferential surface of the steering shaft to absorb steering wheel vibrations and improve handling stability. However, the steering device in Japanese Unexamined Patent Application Publication No. Hei9 (1997)-303387 is designed for use with plain bearings and cannot be used with roller bearings.

The steering device in Japanese Unexamined Patent Application Publication No. 2005-53292 applies frictional resistance to the steering shaft by way of a cylindrical friction application member mounted by way of an O-ring on the rear end outer circumferential surface of the steering shaft axially supported by the rolling bearing to allow rotation at the front end of the steering shaft, and absorbs vibration applied to the steering wheel in order to improve handling stability. However the steering device of Japanese Unexamined Patent Application Publication No. 2005-53292 is not easily adaptable to steering devices in which the upper column and lower column engage along the axis in a sliding motion.

SUMMARY

The present invention provides a steering device containing a roller bearing that axially supports a rotatable steering shaft to provide improved steering wheel operating stability during high speed driving in steering devices whose upper column and lower column engage along the axis in a sliding motion.

According to a first aspect of the present invention, the steering device is comprised of a lower column, an upper column that engages in a sliding motion with the lower column reciprocally along the axis; a female steering shaft axially supported on the upper column to allow rotation by a rolling bearing installed on the upper side of the upper column, and on which a steering wheel is mounted facing the rear of the vehicle; a male steering shaft axially supported on the lower column to allow rotation by a rolling bearing installed on the lower side of the lower column, and allowing movement along the axis relative to the female steering shaft, and latching so as to transmit the rotation torque, and convey the rotation of the steering wheel to the vehicle wheels; a hollow cylindrical bushing formed with a slit along the axis and that is inserted between the inner circumferential surface of the lower column and outer circumferential surface of the female steering shaft; and an elastic member that is inserted between the outer circumferential surface of the bushing and the inner circumferential surface of the lower column, and applies a force to reduce the diameter of the bushing, and press the inner circumferential surface of the bushing towards the outer circumferential surface of the female steering shaft.

According to a second aspect of the present invention, the steering device of the first aspect of the invention is comprised of a cylindrical surface formed on the middle section of inner circumferential surface along the axis of the bushing and capable of making contact with the outer circumferential surface of the female steering shaft; and a tapered surface formed on both ends of the inner circumferential surface along the axis of the bushing, and tapering obliquely from the end along the axis in a direction away from the axial center; and in which the elastic member is positioned at the middle section along the axis of the bushing.

According to a third aspect of the present invention, the steering device according to either one of the first aspect to the second aspect of the invention, in which the bushing is mounted on the outer circumferential surface of the female steering shaft at the latching section for mating the male steering shaft and the female steering shaft.

According to a fourth aspect of the present invention, the steering device according to either one of the first aspect to the second aspect of the invention, comprised of a annular flange section formed on the outer circumferential surface of the bushing; and an annular groove formed on the inner circumferential surface of the lower column in which the annular flange is inserted to prevent axial movement of the bushing.

According to a fifth aspect of the present invention, the steering device according to one of the first aspect to the second aspect of the invention is comprised of a large-diameter inner circumferential surface formed on the inner circumferential surface of the lower column, and in which the outer circumferential surface of the bushing fits into; a small-diameter inner circumferential surface formed on the inner circumferential surface of the lower column on the upper side farther than the large-diameter inner circumferential surface; a step section formed on the joint section joining the large-diameter inner circumferential surface and the small-diameter inner circumferential surface, and in direct contact with one of the edge surface of the bushing; and a stop ring in direct contact with the other edge surface of the bushing inserted into the annular groove formed on the large-diameter inner circumferential surface.

According to a sixth aspect of the present invention, the steering device according to one of the first aspect to the second aspect of the invention, in which the aforementioned slit is formed as a slope from the edges on the left and right sides along the axis of the bushing towards the center.

According to a seventh aspect of the present invention, the steering device according to one of the first aspect to the second aspect of the invention, in which the aforementioned slit is formed as a slope from one edge along the axis of the bushing towards the other edge.

According to an eighth aspect of the present invention, the steering device according to one of the first aspect to the second aspect of the invention, in which a mutually latching rectangular protrusion and a rectangular cavity are formed at opposite locations enclosing the slot.

According to a ninth aspect of the present invention, the steering device according to one of the first aspect to the second aspect of the invention, in which a plurality of elastic members are formed separately along the axis of the bushing.

According to a tenth aspect of the present invention, the steering device according to one of the first aspect to the second aspect of the invention, comprised of a plurality of radial protrusions formed on the outer circumferential surface of the bushing, and latching grooves formed on the inner circumferential surface of the lower column to latch with the radial protrusions and prevent the bushing from rotating on the lower column.

According to the aspects of the present invention, the steering device includes a female steering shaft axially supported on the upper column to allow rotation by a rolling bearing installed on the upper column side, and on which a steering wheel is mounted facing the rear of the vehicle; a male steering shaft axially supported on the lower column to allow rotation by a rolling bearing installed on the lower side of the lower column, and allowing movement along the axis relative to the female steering shaft, and engaging so as to transmit the rotation torque, and convey the rotation of the steering wheel to the vehicle wheels; a hollow cylindrical bushing formed with a slit along the axis and that is inserted between the inner circumferential surface of the lower column and outer circumferential surface of the female steering shaft; and an elastic member that is inserted between the outer circumferential surface of the bushing and the inner circumferential surface of the lower column, and applies a force to reduce the diameter of the bushing, and press the inner circumferential surface of the bushing towards the outer circumferential surface of the female steering shaft.

A specified frictional force therefore occurs between the outer circumferential surface of the female steering shaft and inner circumferential surface of the bushing so that the steering wheel has a satisfactory handling feel, and improved steering wheel handling stability during high-speed driving. Vibration in the female steering shaft is moreover absorbed by an elastic member and vibrations in the wheel axis are not easily conveyed to the steering wheel so that handling is enhanced.

BRIEF DESCRIPTION OF THE DRAWINGS

FIG. 11B is a cross sectional view taken along lines G-G in FIG. 12A;

DESCRIPTION

Figure 1:
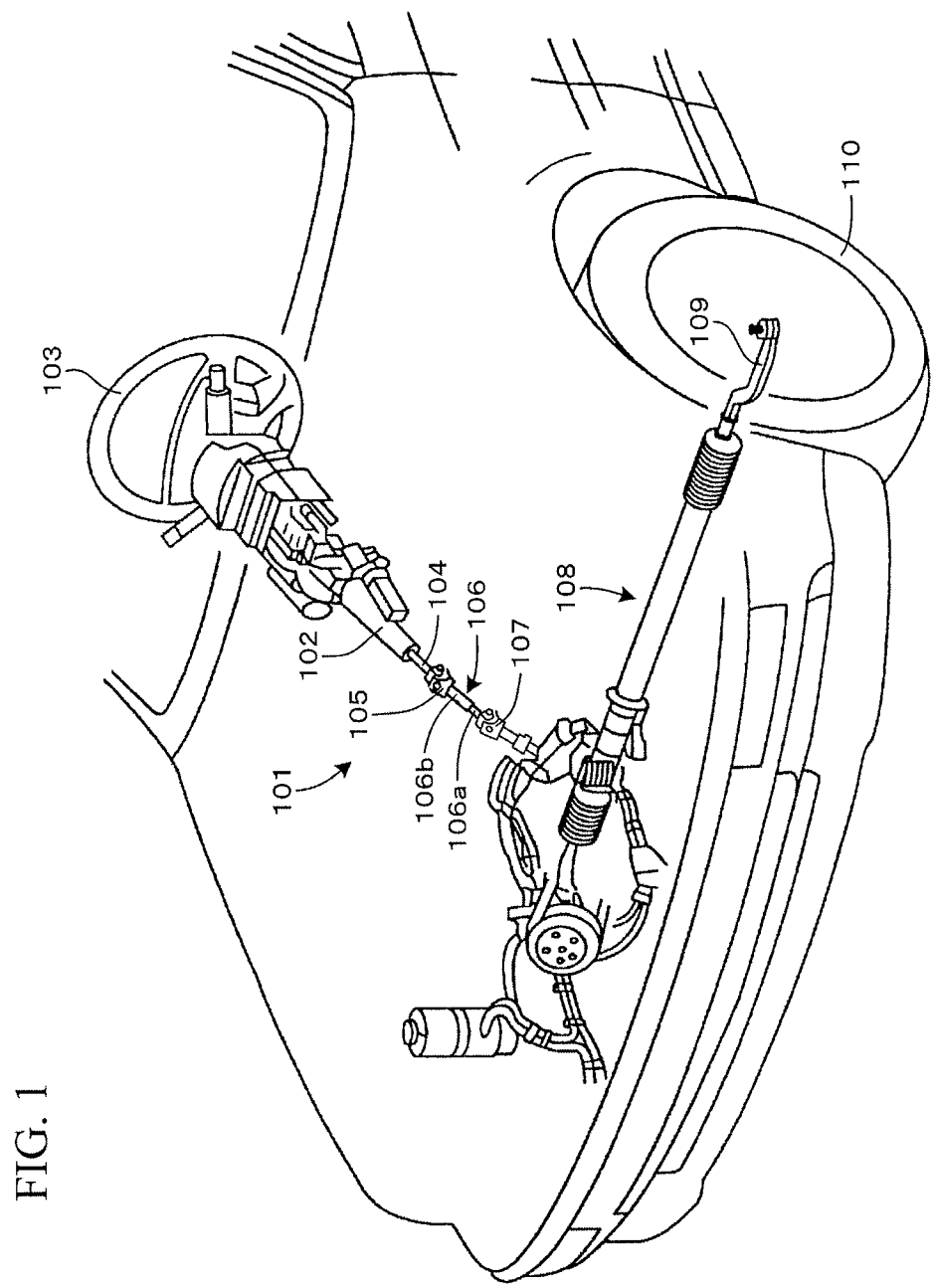
FIG. 1 is an overall perspective view showing the state where the steering device of the embodiment of the present invention is installed in the vehicle chassis.

The first through the eighth embodiments of the present invention are described next while referring to the drawings.
First Embodiment FIG. 1 is an overall perspective view showing the state where the steering device 101 of the embodiment of the present invention is installed in the vehicle chassis. As shown in FIG. 1, a hollow cylindrical column 102 is installed in the vehicle chassis, and a steering shaft 104 is axially supported to allow rotation in this column 102. A steering wheel 103 is mounted on the right end (rearward side of vehicle-chassis) of this steering shaft 104, and an intermediate shaft 106 is coupled byway of a universal joint 105 to the left end (frontward side of chassis) of the steering shaft 104.

The intermediate shaft 106 is comprised of a solid intermediate inner shaft 106a forming a male spline, and an intermediate outer shaft 106b in a hollow cylindrical shape forming a female spline. The male spline of the intermediate inner shaft 106a can elongate and contract (slide) to the female spline on the intermediate outer shaft 106b and can also latch to transmit the rotational torque.

The rearward vehicle-chassis side of the intermediate outer shaft 106b is moreover coupled to the universal joint 105, and the forward vehicle-chassis side of the intermediate inner shaft 106a is coupled to the universal joint 107. The universal joint 107 is coupled to a pinion meshed to the rack not shown in the drawing of the steering gear 108.

When the driver turns the steering wheel 103, that rotational force is applied to the steering gear 108 by way of the steering shaft 104, the universal joint 105, the intermediate shaft 106, and the universal joint 107, to move the tie rod 109 by way of the rack-and-pinion mechanism, and change the steering angle of the vehicle (steered) wheels 110.

Figure 2:
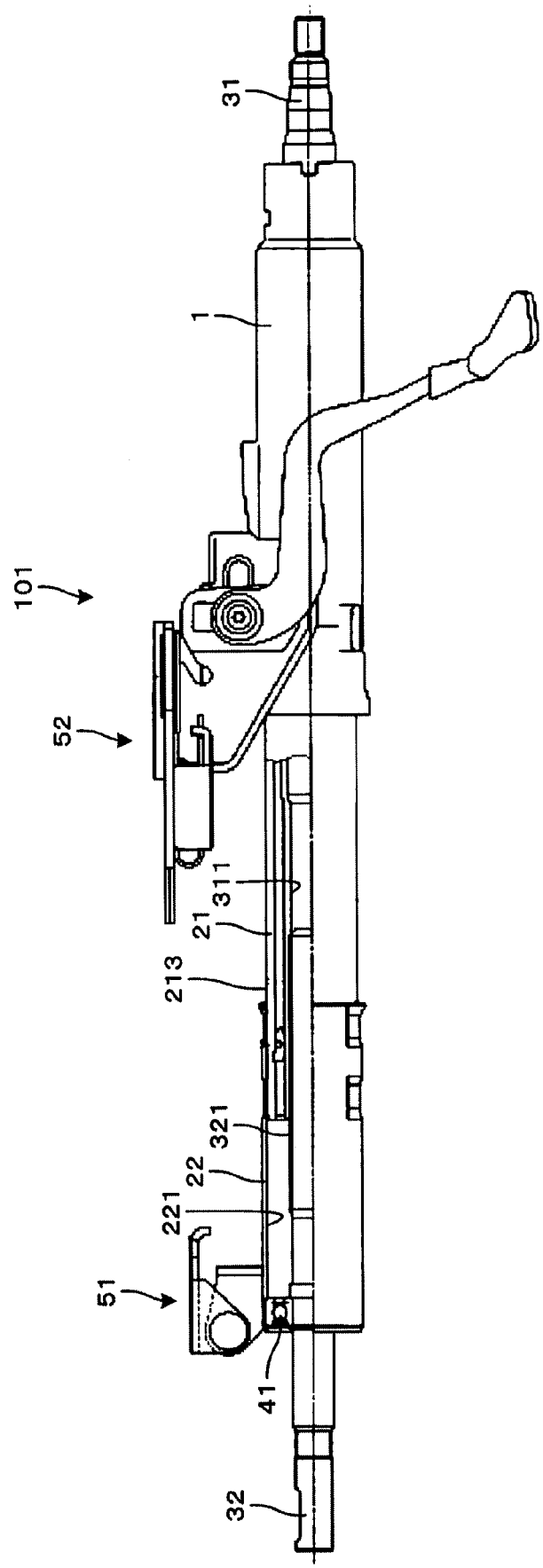
FIG. 2 is a frontal view of a cross sectional portion showing a major section of the steering device of the embodiment of the present invention.
Figure 3:
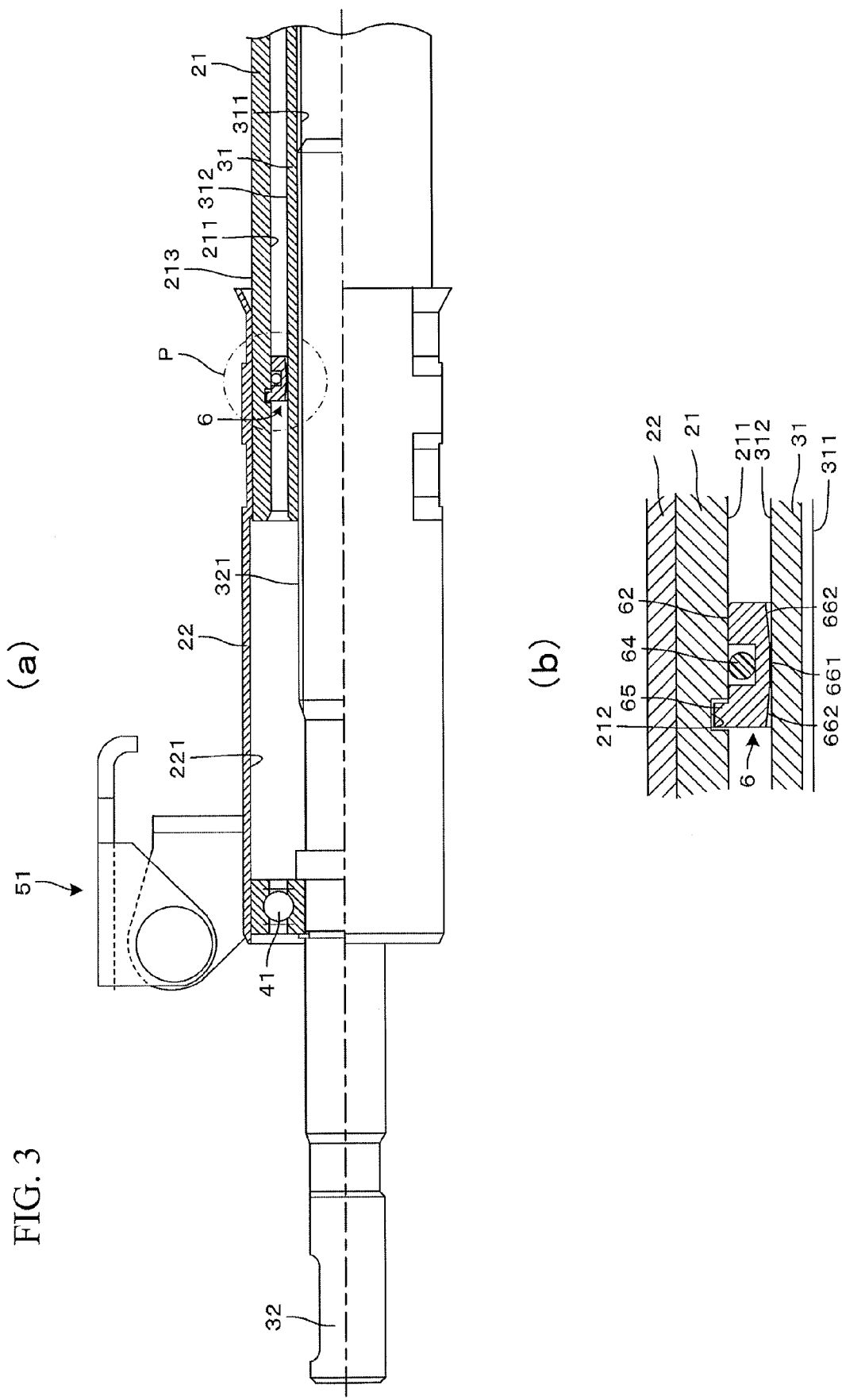
FIG. 3A is an enlarged cross sectional view showing the vicinity of the bushing of the first embodiment of the present invention.
FIG. 3B is an enlarged cross sectional view of the P section in FIG. 3A.

FIG. 2 is a frontal view of a cross sectional portion showing a major section of the steering device of the embodiment of the present invention. FIG. 3A is an enlarged cross sectional view showing the vicinity of the bushing of the first embodiment of the present invention. FIG. 3B is an enlarged cross sectional view of the P section in FIG. 3A. As can be seen in FIG. 2 and FIG. 3, the upper column (outer column) 1 is clamped to the vehicle chassis not shown in the drawing by an upper chassis installation bracket 52. The outer circumferential surface of the hollow cylindrical first lower column (inner column) 21 latches closely at a telescopically adjustable position along the axis, at the vehicle forward chassis side (left side of FIG. 2) of the hollow cylindrical upper column 1.

The inner circumferential surface 221 in the hollow cylindrical second lower column (inner column) 22 latches closely in a collapsing movement along the axis, on the outer circumferential surface 213 of the first lower column 21 on the forward vehicle-chassis side (left side of FIG. 2) on the first lower column 21. The forward vehicle-chassis end of the second lower column 22 is clamped by the lower chassis installation bracket 51 on the vehicle chassis not shown in the drawing to allow pivoting. The inner circumferential surface 221 of the second lower column 22 is secured to the outer circumferential surface 213 of the first lower column 21 by a caulking process. When an impact is applied to the front of the vehicle during a secondary collision, the caulked section deforms due to plasticizing, so that the first lower column 21 collapses relative to the second lower column 22 in a movement toward the front of the vehicle.

The female steering shaft (upper steering shaft) 31 is inserted to the axial center on the upper column 1, and is axially supported at the right end (upper side) of the female steering shaft 31 to allow rotation by a rolling bearing (not shown in drawing) press-fit into the right end (upper side) of the inner circumferential surface of the upper column 1. The steering wheel 103 of FIG. 1 is mounted on the right end (vehicle rearward side) of the female steering shaft 31.

A male steering shaft 32 is inserted into the inner circumferential surface 221 of the second lower column 22, and is axially supported at the left end (lower side) of the male steering shaft 32 to allow rotation by a rolling bearing (deep groove ball bearing) 41 press-fit into the left end (lower side) of the inner circumferential surface 221 of the second lower column 22. A male spline 321 is formed on the right side of the male steering shaft 32, for movement to the female spline 311 formed on the left side of the female steering shaft 31 relative to the axial direction, and to also make the spline latch to allow transmitting the rotational torque.

Figure 4:
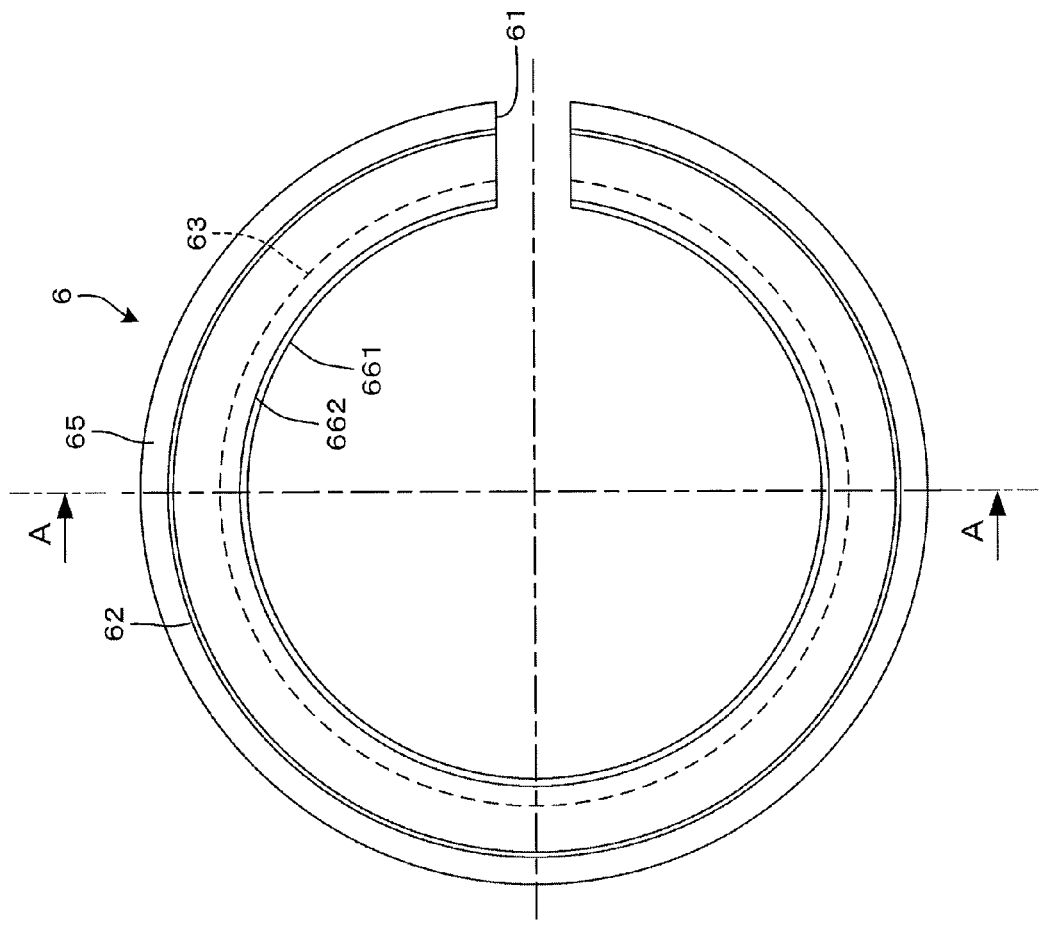
FIG. 4A is an enlarged frontal view showing the bushing of the first embodiment of the present invention.
FIG. 4B is a cross sectional view taken along lines A-A in FIG. 4A.
Figure 4:
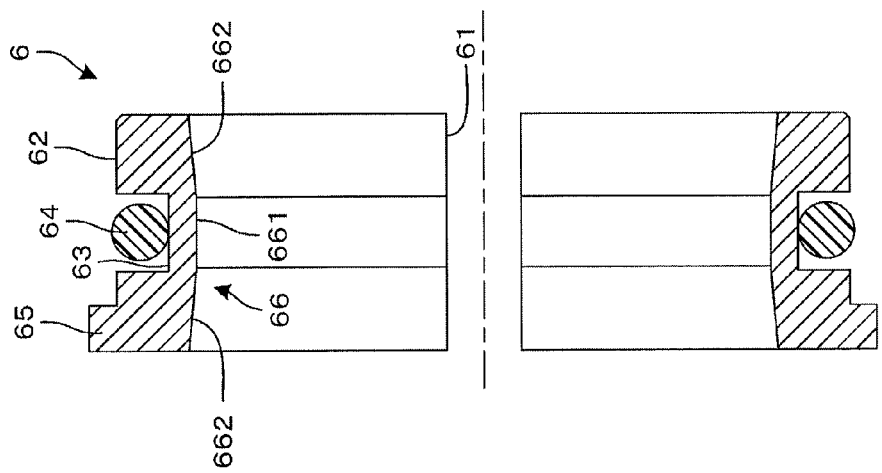

As can be seen in FIG. 3A and FIG. 3B, a plastic bushing 6 shown in FIG. 4 is inserted between the inner circumferential surface 211 of the first lower column 21 and the spline mating section as seen along the axis, on the outer circumferential surface 312 of the female steering shaft 31. The bushing 6 as shown in FIG. 4 is a hollow cylindrical shape and one slit 61 is formed along the entire axial length.

An annular groove 63 is formed in the intermediate section along the axis (on left and right of FIG. 3B) on the outer circumferential surface 62 of the bushing 6, and an annular circular O-ring (elastic member) 64 having a circular cross section is inserted into the annular groove 63. The O-ring 64 is made from an elastic member such as synthetic rubber. An annular flange 65 with a diameter larger than the outer circumferential surface 62 is formed on the left edge along the axis on the outer circumferential surface 62 of the bushing 6.

A cylindrical surface 661 is formed in the intermediate section along the axis on the inner circumferential surface 66 of the bushing 6, and the taper surfaces 662, 662 are formed on both ends along the axis. The tapered surfaces 662, 662 are formed so that the axial ends slope in a direction away from the axial center. The inner diameter dimensions of the cylindrical surface 661 of the bushing 6 are formed somewhat larger than the outer diameter dimensions of the outer circumferential surface 312 of the female steering shaft 31 while in the state prior to insertion of the bushing 6 into the inner circumferential surface 211 of the first lower column 21.

The diameter of the bushing 6 contracts as the gap in the slit 61 narrows when the bushing 6 is inserted into the inner circumferential surface 211 of the first lower column 21 and so the bushing 6 can easily insert into the inner circumferential surface 211 of the first lower column 21. When the bushing 6 with a now smaller diameter is inserted into the inner circumferential surface 211 of the first lower column 21, the annular flange 65 of the bushing 6 fits into the annular groove (See FIG. 3B) 212 formed in the inner circumferential surface 211 of the first lower column 21 and prevents axial movement of the bushing 6.

The inner circumferential surface 211 of the first lower column 21 presses and crushes the O-ring 64 so that the elastic force of the O-ring 64 causes the inner diameter dimensions of the cylindrical surface 661 of the bushing 6 to become somewhat smaller than the outer diameter dimensions of the outer circumferential surface 312 of the female steering shaft 31. The O-ring 64 is mounted at the same axial position as the cylindrical surface 661 so that the elastic force of the O-ring 64 makes the diameter of the cylindrical surface 661 of bushing 6 narrow to a good dimensional accuracy.

The upper column 1 containing the female steering shaft 31 is afterwards fitted onto the first lower column 21. Also, the second lower column 22 containing the male steering shaft 32 is fitted over the first lower column 21 and is tightened by a caulking process to the outer circumferential surface 213 of the first lower column 21.

The tapered surfaces 662, 662 are formed along both axial ends on the inner circumferential surfaces 66 of the bushing 6 so that the outer circumferential surface 312 of the female steering shaft 31 is guided to the tapered surfaces 662, and inserted smoothly into the cylindrical surface 661 of the bushing 6. These tapered surfaces 662, 662 are moreover formed on both ends along the axis of the bushing 6 so that outer circumferential surface 312 of the female steering shaft 31 slides smoothly along the cylindrical surface 661 of bushing 6 during the telescopic position adjustment.

When the outer circumferential surface 312 of the female steering shaft 31 is inserted onto the cylindrical surface 661 of bushing 6, the elastic force of the O-ring 64 acts to tighten (bind) to the outer circumferential surface 312 of female steering shaft 31, by way of the cylindrical surface 661 of bushing 6. The axial position where the bushing 6 tightens to the outer circumferential surface 312 of female steering shaft 31 is the spline latching section between the male steering shaft 32 and the female steering shaft 31.

In the first embodiment of the present invention, a specified frictional force is made to occur between the outer circumferential surface 312 of female steering shaft 31 and the cylindrical surface 661 of bushing 6 so that the steering wheel 103 has a satisfactory handling feel and the operating stability of the steering wheel 103 is improved during high-speed driving. Moreover, the O-ring 64 attains a crushed state after press-fitting by the inner circumferential surface 211 of the first lower column 21 so that the O-ring absorbs the vibrations of the female steering shaft 31 with the result that vibrations in the wheel axis are not easily conveyed to the steering wheel 103 and there is a better feel when handling (steering) the vehicle.

In the first embodiment, an annular flange 65 with a diameter larger than the outer circumferential surface 62 was formed on the outer circumferential surface 62 of the bushing 6. However, a bushing 6 without a large-diameter annular flange 65 may be used that allows inserting the entire bushing 6 into the long annular groove formed along the axis on the inner circumferential surface 211 of the first lower column 21. Use of the bushing 6 without an annular flange 65 is preferable because it alleviates problems due to limits on the bushing 6 thickness or problems with using a first lower column 21 having larger outer diameter dimensions.

Second Embodiment

Figure 5:
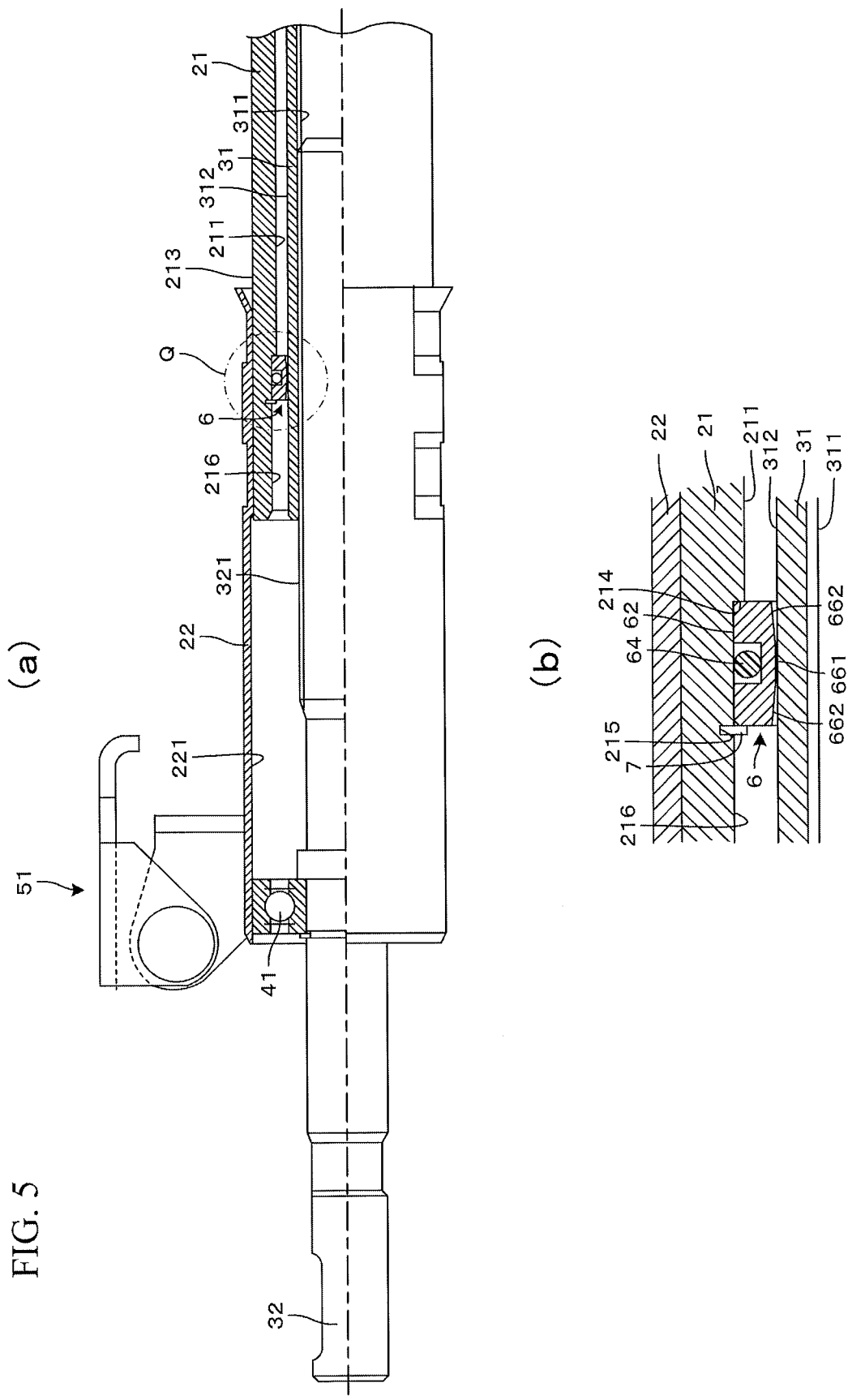
FIG. 5A is an enlarged cross sectional view showing the vicinity of the bushing of the second embodiment of the present invention.
FIG. 5B is an enlarged cross sectional view of the Q section in FIG. 5A.

The second embodiment of the present invention is described next. FIG. 5A is an enlarged cross sectional view showing the vicinity of the bushing of the second embodiment of the present invention. FIG. 5B is an enlarged cross sectional view of the Q section in FIG. 5A. FIG. 6A is an enlarged frontal view showing the bushing of the second embodiment of the present invention. FIG. 6B is a cross sectional view taken along lines B-B in FIG. 6A. In the following description, only those structural sections different from the above embodiment are described, and a description of redundant sections is omitted. Moreover, in the following description the same reference numerals are assigned to the same parts. The second embodiment is a modification of the first embodiment and utilizes a bushing 6 in which the annular flange 65 of the first embodiment is omitted.

As can be seen in the figure, in the second embodiment, a large-diameter inner circumferential surface 216 is formed across a specified length from the left edge (lower side) of the first lower column 21 on the inner circumferential surface of the first lower column 21. An inner circumferential surface 211 is formed adjacent to the right edge (upper side) of the large-diameter inner circumferential surface 216. Both the large-diameter inner circumferential surface 216 and the inner circumferential surface 211 are tubular shapes, and the inner diameter dimension of the inner circumferential surface 211 is smaller than that of the large-diameter inner circumferential surface 216. The step section 214 is formed at the section joining the large-diameter inner circumferential surface 216 and the inner circumferential surface 211.

Figure 6:
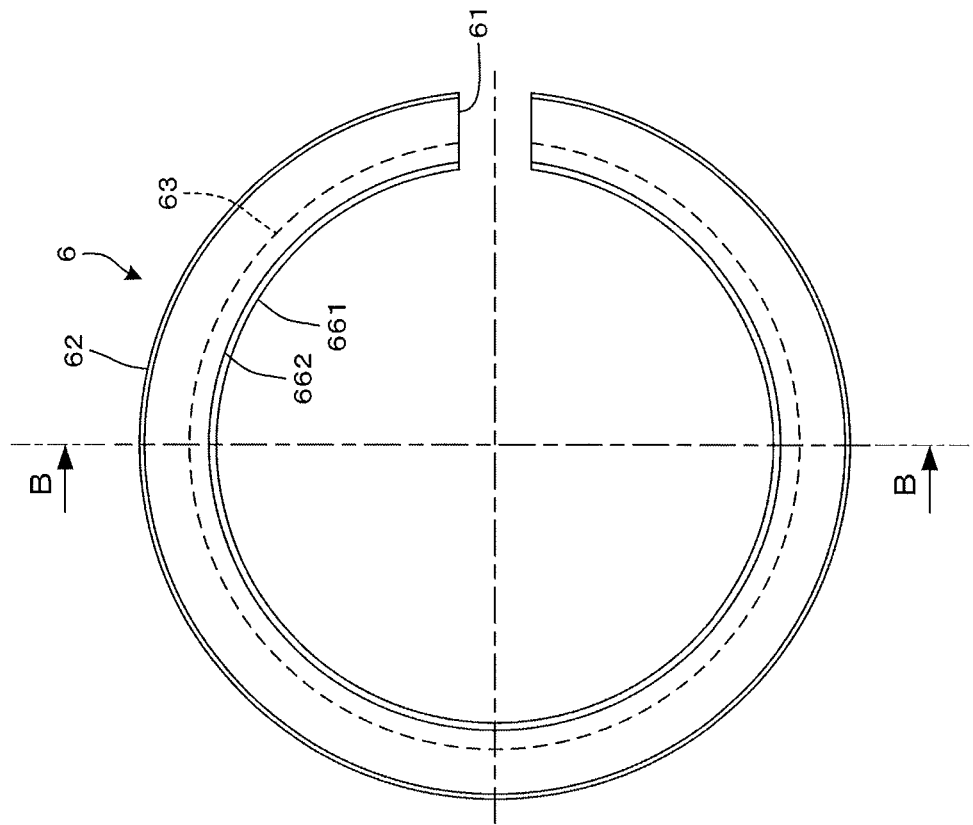
FIG. 6A is an enlarged frontal view showing the bushing of the second embodiment of the present invention.
FIG. 6B is a cross sectional view taken along lines B-B in FIG. 6A.
Figure 6:
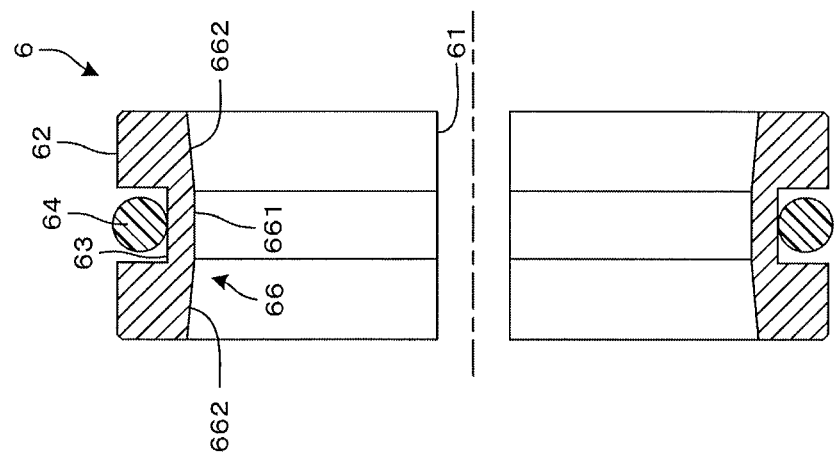

On the outer circumferential surface 312 of the female steering shaft 31, the plastic bushing 6 shown in FIG. 6 is inserted between the spline latching section and the large-diameter inner circumferential surface 216 of the first lower column 21 as seen from an axial direction. As shown in FIG. 6, the bushing 6 is hollow cylindrical shape and one slit 6 is formed across the entire length along the axial direction of the bushing 6.

The outer circumferential surface 62 of the bushing 6 of the second embodiment is formed to the same outer diameter dimensions across the entire length along the axial direction, and there is no annular flange 65 of the first embodiment. An annular groove 63 is formed in the intermediate section along the axis (towards left and right in FIG. 6B) on the outer circumferential surface 62, and an annular O-ring (elastic member) 64 having circular cross section is inserted into a circular cross section of the annular groove 63. The O-ring 64 is made from an elastic material such as synthetic rubber.

A cylindrical surface 661 is formed on the intermediate section along the axis and the tapered surfaces 662 662 are formed along the axis on both ends of the inner circumferential surface 66 of the bushing 6. The tapered surfaces 662, 662 are made so that the axial ends slope in a direction away from the axial center. The inner diameter dimensions of the cylindrical surface 661 of the bushing 6 are formed somewhat larger than the outer diameter dimensions of the outer circumferential surface 312 of the female steering shaft 31 while in the state prior to insertion of the bushing 6 into the large-diameter inner circumferential surface 216 of the first lower column 21.

The diameter of the bushing 6 contracts as the gap in the slit 61 narrows when the bushing 6 is inserted into the large-diameter inner circumferential surface 216 of the first lower column 21 and so the bushing 6 can easily insert into the large-diameter inner circumferential surface 216 of the first lower column 21. When the bushing 6 with a now smaller diameter is inserted into the large-diameter inner circumferential surface 216 of the first lower column 21, one edge of the bushing 6 makes direct contact with the step section (See FIG. 5B) formed on the inner circumference of the first lower column 21. A stop ring 7 such as a C-shaped stop ring or a C-ring is afterwards fitted into the annular groove 215 formed in the large-diameter inner circumferential surface 216, and the stop ring 7 makes direct contact with the other edge of the bushing 6 to prevent axial movement of the bushing 6.

The large-diameter inner circumferential surface 216 of the first lower column 21 presses and crushes the O-ring 64 so that the elastic force of the O-ring 64 causes the inner diameter dimensions of the cylindrical surface 661 of the bushing 6 to become somewhat smaller than the outer diameter dimensions of the outer circumferential surface 312 of the female steering shaft 31. The O-ring 64 is mounted at the same position along the axial direction as the cylindrical surface 661 so that the elastic force of the O-ring 64 makes the diameter of the cylindrical surface 661 of bushing 6 narrow to a good dimensional accuracy.

The upper column 1 containing the female steering shaft 31 is afterwards fitted onto the first lower column 21. Also, the second lower column 22 containing the male steering shaft 32 is fitted onto the first lower column 21 and is tightened by a caulking process to the outer circumferential surface 213 of the first lower column 21.

The tapered surfaces 662, 662 are formed along both axial ends on the inner circumferential surfaces 66 of the bushing 6 so that the outer circumferential surface 312 of the female steering shaft 31 is guided to the tapered surfaces 662, and inserted smoothly into the cylindrical surface 661 of the bushing 6. These tapered surfaces 662, 662 are moreover formed on both ends along the axis of the bushing 6 so that outer circumferential surface 312 of the female steering shaft 31 slides smoothly along the cylindrical surface 661 of bushing 6 during the telescopic position adjustment.

When the outer circumferential surface 312 of the female steering shaft 31 is inserted onto the cylindrical surface 661 of bushing 6, the elastic force of the O-ring 64 acts to tighten (bind) to the outer circumferential surface 312 of female steering shaft 31, by way of the cylindrical surface 661 of bushing 6. The axial position where the bushing 6 tightens to the outer circumferential surface 312 of female steering shaft 31 is the spline latching section between the male steering shaft 32 and the female steering shaft 31.

In the second embodiment of the present invention, the bushing 6 contains no large-diameter annular flange 65 which is preferable because along with easing restrictions on the thickness of the bushing 6, the problem of larger outer diameter dimensions on the first lower column 21 is also alleviated.

Third Embodiment

Figure 7:
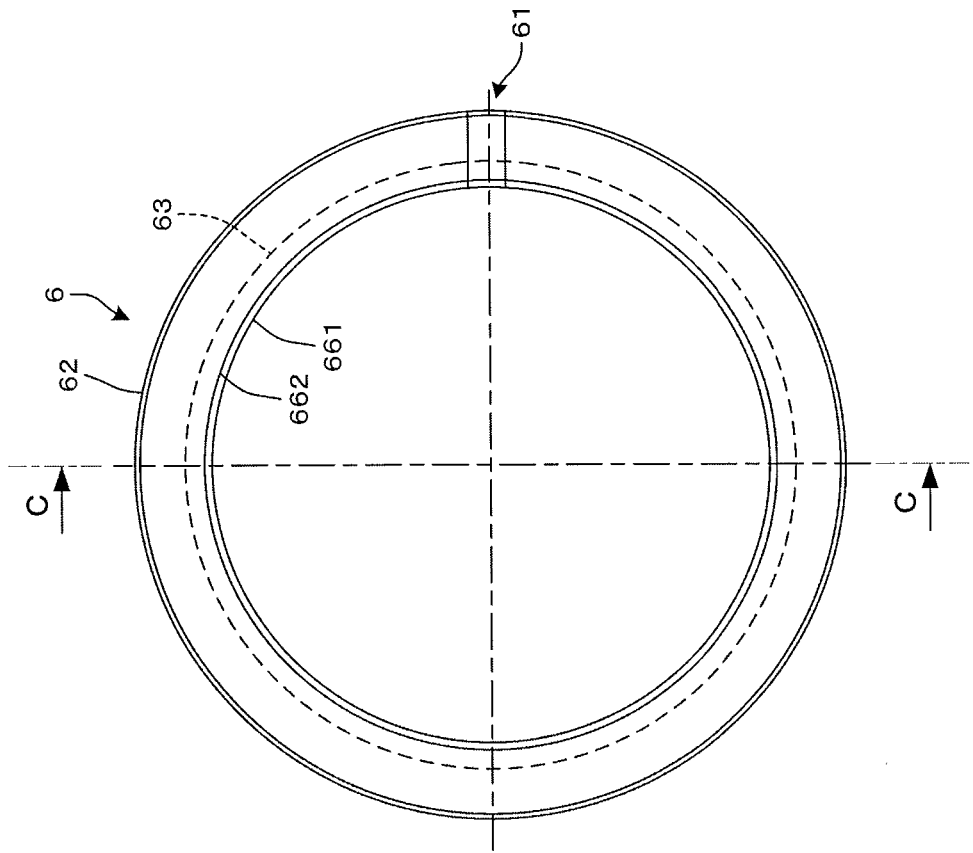
FIG. 7A is an enlarged frontal view showing the bushing of the third embodiment of the present invention.
FIG. 7B is a cross sectional view taken along lines C-C in FIG. 7A.
Figure 7:
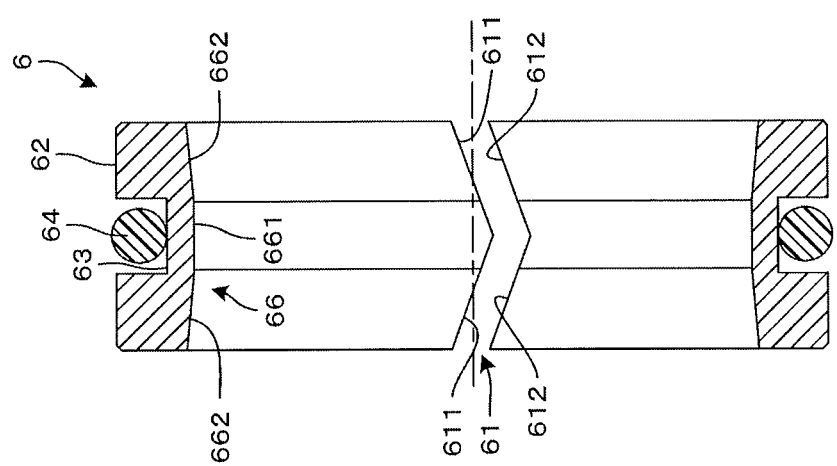

The third embodiment of the present invention is described next. FIG. 7A is an enlarged frontal view showing the bushing of the third embodiment of the present invention. FIG. 7B is a cross sectional view taken along lines C-C in FIG. 7A. In the following description, only those structural sections different from the above embodiments are described, and a description of redundant sections is omitted. Moreover, in the following description, the same reference numerals are assigned to the same parts. The third embodiment is a modification of the second embodiment and utilizes a V-shaped cross section as the slit 61 of the second embodiment.

As shown in FIG. 7B, a slit 61 is formed across the entire length along the axial direction on the bushing 6. As can be seen in FIG. 7B, the sloped surfaces 611, 611 are formed mutually sloping downwards along the circumference from the edges on both the left and right axial sides towards the center on the upper side of the slit 61. Also in the same way as seen in FIG. 7B, the sloping surfaces 612, 612 are formed mutually sloping downwards along the circumference from the edges on both the left and right axial sides towards the center on the lower side of the slit 61.

The opposing sloped surfaces 611 and 612 are formed in parallel with each other. The sloped surfaces 611, 611 are formed protruding outwards, and the sloped surfaces 612, 612 are formed in cavity shape so that the slit 61 is formed in an approximately V shape. The width (gap between the sloped surface 611 and the sloped surface 612) of the slit 61 is drawn with an exaggerated width in FIG. 7B. However, the width of the slit 61 maybe narrowed if the internal diameter dimensions of the cylindrical surface 661 of bushing 6 are reduced to dimensions slightly smaller than the outer diameter dimensions of the outer circumferential surface 312 of the female steering shaft 31.

In the third embodiment of the present invention utilizing the V-shape for the slit 61, axial movement by the opposing surfaces of the bushing that enclose the slit 61 relative to each other might become difficult when inserting the bushing 6 into the large-diameter inner circumferential surface 216 of the first lower column 21, during a mutual sliding action by the cylindrical surface 661 of the bushing 6 and the outer circumferential surface 312 of the female steering shaft 31.

Figure 8:
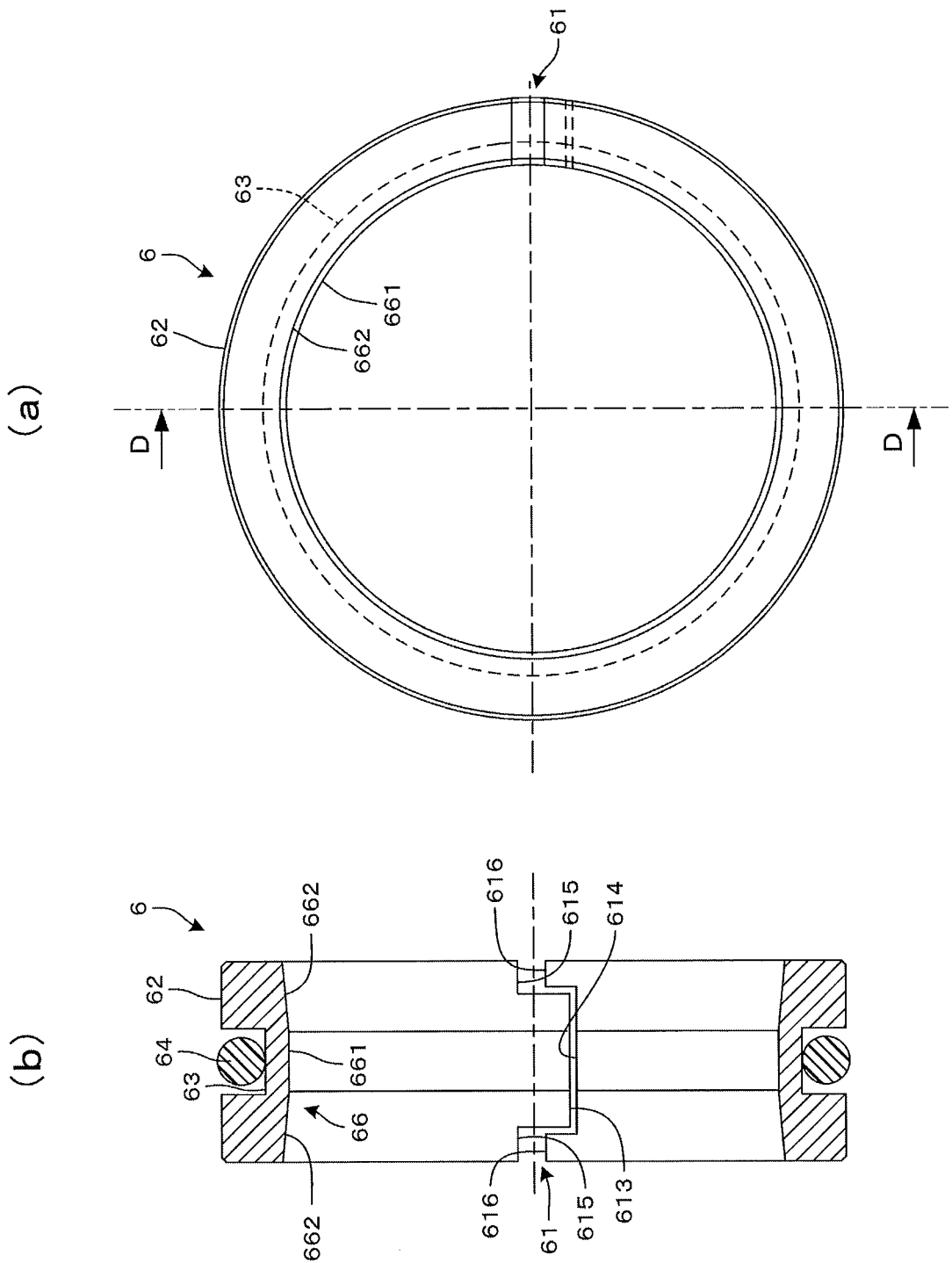
FIG. 8A is an enlarged frontal view showing the bushing of the fourth embodiment of the present invention.
FIG. 8B is a cross sectional view taken along lines D-D in FIG. 8A.

Namely, when the sloped surfaces 611, 611 have moved to the left, and the sloped surfaces 612, 612 have moved to the right as can be seen in FIG. 7B, then the sloped surfaces 611 and the sloped surfaces 612 make direct contact which prevents the bushing 6 from twisting. Continuously maintaining the cylindrical surface 661 of bushing 6 in a cylindrical shape, therefore stabilizes the frictional force between the outer circumferential surface 312 of the female steering shaft 31 and the cylindrical surface 661 of bushing 6, and enhances the handling stability of the steering wheel 103 during high-speed driving. Moreover, when shipping the bushings 6 as individual pieces, these bushings 6 will not easily entangle with one another even if delivering the plural bushings 6 in the same box so that handling of the bushings 6 is simple Fourth Embodiment The fourth embodiment of the present invention is described next. FIG. 8A is an enlarged frontal view showing the bushing of the fourth embodiment of the present invention. FIG. 8B is a cross sectional view taken along lines D-D in FIG. 8A. In the following description, only those structural sections different from the above embodiment are described and a description of redundant sections is omitted. Moreover, in the following description the same reference numerals are assigned to the same parts. The fourth embodiment is a modification of the second embodiment and the example utilizes irregularities (protrusions and cavities) on the slit 61 of the second embodiment.

As shown in FIG. 8B, a slit 61 is formed across the entire length along the axial direction on the bushing 6. As can be seen in FIG. 8B, a rectangular protrusion 613 is formed downwards along the circumference in the axial center on the upper side of the slit 61. The edges 615, 615 are formed on both sides of the protrusion 613. Also in the same way as seen in FIG. 8B, a rectangular cavity 614 is formed downwards along the circumference in the axial center on the lower side of the slit 61 in a position complementary to the protrusion 613. The edges 616, 616 are formed on both sides of the cavity 614.

The widths of the protrusion 613 and the cavity 614 as can be seen from FIG. 8B are respectively larger than the width of the cylindrical surface 661. The cylindrical surface 661 is in other words formed entirely on the protrusion 613. The protrusion 613 and the cavity 614 can latch with each other by making the width of the protrusion 613 slightly smaller than the width of the cavity 614. A gap can also be formed between the mutually opposing protrusion 613 and the cavity 614 enclosing the slit 61 that matches the extent that the diameter of the bushing 6 contracts. A gap can also be formed in the same way between the mutually opposing edge 615 and edge 616 matching the extent that the diameter of the bushing 6 contracts. The slit 61 can in this way possess an irregular (protrusion and cavity) shape by forming the protrusion 613 and the cavity 614 at mutually opposing points enclosing the slit 61 to allow mutual latching.

In the fourth embodiment of the present invention utilizing an irregular (protrusion and cavity) slit 61, axial movement by the opposing surfaces that enclose the slit 61 might become difficult relative to each other when inserting the bushing 6 into the large-diameter inner circumferential surface 216 of the first lower column 21 during mutual sliding action by the cylindrical surface 661 of the bushing 6 and the outer circumferential surface 312 of the female steering shaft 31.

In other words, when the protrusion 613 has moved to the left, and the cavity 614 has moved to the right as can be seen in FIG. 8B, then the protrusion 613 and the cavity 614 make direct contact which prevents the bushing 6 from twisting. Continuously maintaining the cylindrical surface 661 of bushing 6 in a cylindrical shape, therefore stabilizes the frictional force between the outer circumferential surface 312 of the female steering shaft 31 and the cylindrical surface 661 of the bushing 6, and enhances the handling stability of the steering wheel 103 during high-speed driving. Moreover, when shipping the bushings 6 as individual pieces, these bushings 6 will not easily entangle with one another even if the plural bushings 6 are delivered in the same box so that handling of the bushings 6 is simple.

Fifth Embodiment

Figure 9:
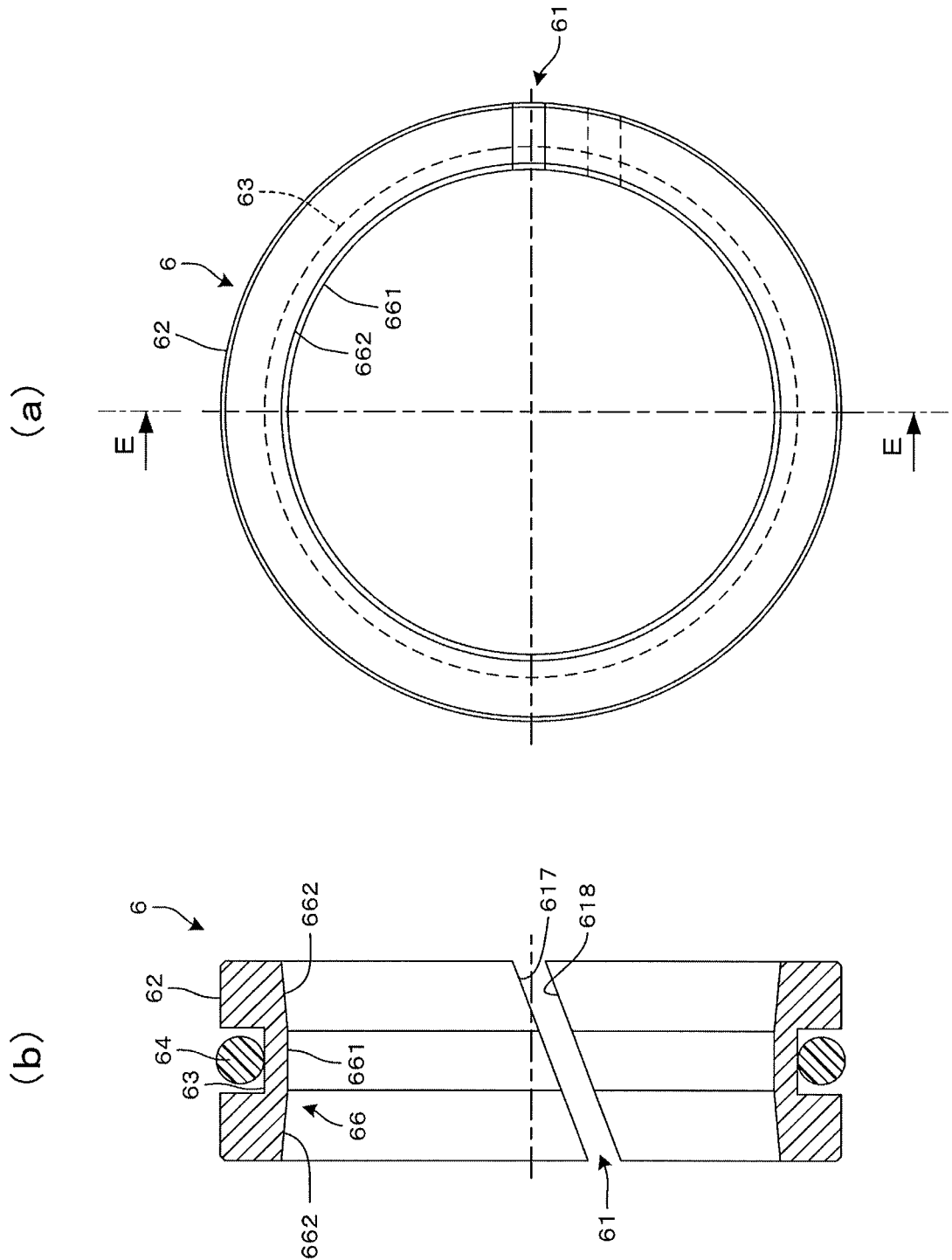
FIG. 9A is an enlarged frontal view showing the bushing of the fifth embodiment of the present invention.
FIG. 9B is a cross sectional view taken along lines E-E in FIG. 9A.

The fifth embodiment of the present invention is described next. FIG. 9A is an enlarged frontal view showing the bushing of the fifth embodiment of the present invention. FIG. 9B is a cross sectional view taken along lines E-E in FIG. 9A. In the following description, only those structural sections different from the above embodiments are described and a description of redundant sections is omitted. Moreover, in the following description, the same reference numerals are assigned to the same parts. The fifth embodiment is a modification of the second embodiment and the example utilizes the slope-shaped slit 61 of the second embodiment.

The slit 61 as shown in FIG. 9B is formed across the entire length along the axial direction on the bushing 6. As can be seen in FIG. 9B, a sloped surface 617 is formed to slope downwards along the circumference as towards the left side edge from the right side edge along the axis, on the upper side of the slit 61. The sloped surface 618 is formed in the same way as shown in FIG. 9B, to slope downwards along the circumference as towards the left side edge from the right side edge along the axis, on the lower side of the slit 61.

The opposing sloped surfaces 617 and 618 are formed parallel with each other. The width (gap between the sloped surface 617 and the sloped surface 618) of the slit 61 in FIG. 9B is drawn so as to exaggerate the width. However, the width of the slit 61 can be narrowed if the internal diameter dimensions of the cylindrical surface 661 of bushing 6 are reduced to dimensions slightly smaller than the outer diameter dimensions of the outer circumferential surface 312 of the female steering shaft 31.

In the fifth embodiment of the present invention utilizing a sloped shape for the slit 611, axial movement by the opposing surfaces that enclose the slit 61 relative to each other might become difficult when inserting the bushing 6 into the large-diameter inner circumferential surface 216 of the first lower column 21, during mutual sliding action by the cylindrical surface 61 of the bushing 6 and the outer circumferential surface 312 of the female steering shaft 31.

In other words, when the sloped surface 617 has moved to the right, and the sloped surface 618 has moved to the left as can be seen in FIG. 9B, then the sloped surface 617 and the sloped surface 618 make direct contact which prevents the bushing 6 from twisting. Continuously maintaining the cylindrical surface 661 of bushing 6 in a cylindrical shape, therefore stabilizes the frictional force between the outer circumferential surface 312 of the female steering shaft 31 and the cylindrical surface 661 of the bushing 6, and enhances the handling stability of the steering wheel 103 during high-speed driving. Moreover, when shipping the bushings 6 as individual pieces, these bushings 6 will not easily entangle with one another even if delivering the plural bushings 6 in the same box so that handling of the bushings 6 is simple.

Sixth Embodiment

Figure 10:
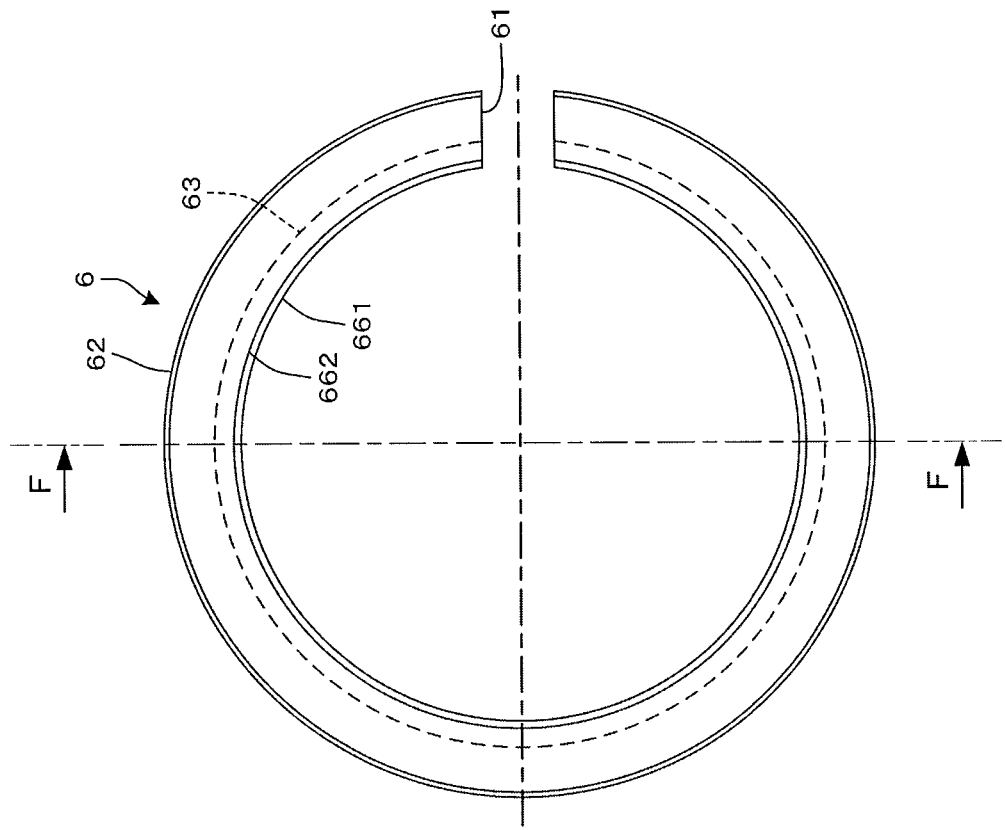
FIG. 10A is an enlarged frontal view showing the bushing of the sixth embodiment of the present invention.
FIG. 10B is a cross sectional view taken along lines F-F in FIG. 10A.
Figure 10:
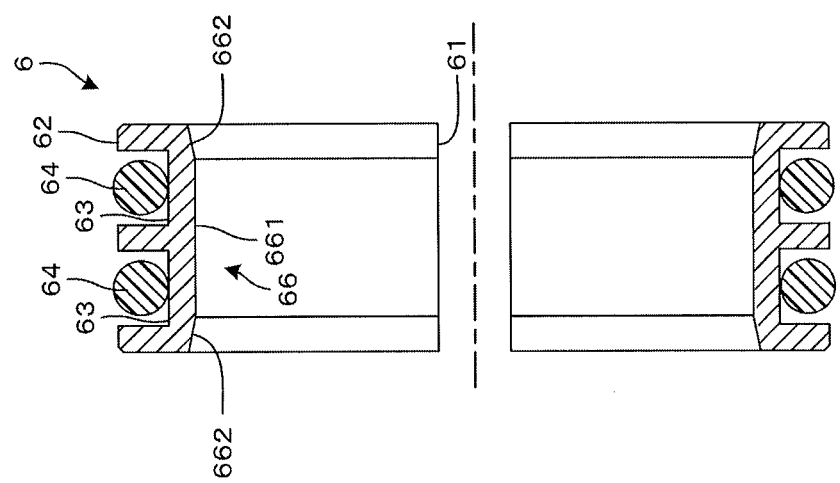

The sixth embodiment of the present invention is described next. FIG. 10A is an enlarged frontal view showing the bushing of the sixth embodiment of the present invention. FIG. 10B is a cross sectional view taken along lines F-F in FIG. 10A. In the following description, only those structural sections different from the above embodiment are described and a description of redundant sections is omitted. Moreover, in the following description, the same reference numerals are assigned to the same parts. The sixth embodiment is a modification of the second embodiment and the example utilizes a plurality of O-rings 64 mounted on the circumferential surface 62 of the bushing 6.

The bushing 6a s shown in FIG. 10B is formed in a hollow tubular state, and one slit 61 is formed across the entire length along the axial direction on the bushing 6. The outer circumferential surface 62 for the bushing 6 is formed to the same outer diameter dimensions across the entire length axially and there is no annular flange 65 that was used in the first embodiment. The annular grooves 63, 63 are formed at two locations (towards left and right in FIG. 10B) axially on the outer circumferential surface 62, and the annular O-rings 64, 64 (elastic members) having a circular cross section are each inserted in the annular grooves 63, 63. The O-rings 64, 64 are made from an elastic member such as synthetic rubber.

The inner circumferential surface 661 is formed in the axial center section, and the tapered surfaces 662, 662 are formed on both edges axially on the inner circumferential surface 66 of the bushing 6. The tapered surfaces 662, 662 are formed with the axial ends sloping in a direction away from the axial center. The inner diameter dimensions of the cylindrical surface 661 of the bushing 6 are formed somewhat smaller than the outer diameter dimensions of the outer circumferential surface 312 of the female steering shaft 31 while in the state prior to insertion of the bushing 6 into the larger-diameter inner circumferential surface 216 of the first lower column 21.

The diameter of the bushing 6 contracts as the gap in the slit 61 narrows when the bushing 6 is inserted into the large-diameter inner circumferential surface 216 of the first lower column 21, so the bushing 6 can easily insert into the large-diameter inner circumferential surface 216. The large-diameter inner circumferential surface 216 of the first lower column 21 presses and crushes the O-rings 64, 64 so that the elastic force of the O-rings 64, 64 causes the inner diameter dimensions of the cylindrical surface 661 of the bushing 6 to become somewhat smaller than the outer diameter dimensions of the outer circumferential surface 312 of the female steering shaft 31. The elastic force of the O-rings 64, 64 renders the effect of lengthening the cylindrical surface 661 axial length so that the O-rings 64, 64 elastic force makes the diameter of the cylindrical surface 661 of bushing 6 narrow to a good dimensional accuracy.

In the sixth embodiment of the present invention, the elastic force applied by the plural O-rings causes the diameter of the inner diameter dimensions of the cylindrical surface 661 of the bushing 6 to contract to a good dimensional accuracy so that along with obtaining a large frictional force between the outer circumferential surface 312 of the female steering shaft 31 and the cylindrical surface 661 of the bushing 6, the frictional force is stabilized, and the handling stability of the steering wheel 103 during high-speed driving is enhanced. The plurality of O-rings 64, 64 absorb the vibrations of the female steering shaft 31 with the result that vibrations in the wheel axis are not easily conveyed to the steering wheel 103 and there is a better feel when handling (steering) the vehicle.

Seventh Embodiment

The seventh embodiment of the present invention is described next. FIG. 11A is an enlarged cross sectional view showing the vicinity of the bushing of the seventh embodiment of the present invention. FIG. 11B is an enlarged cross sectional view of the R section of FIG. 11A. FIG. 12A is an enlarged frontal view of the bushing of the seventh embodiment of the present invention. FIG. 12B is a cross-sectional view taken along the lines G-G in FIG. 12A. In the following description, only those structural sections different from the above embodiments are described and a description of redundant sections is omitted. Moreover, in the following description, the same reference numerals are assigned to the same parts. The seventh embodiment is a modification of the second embodiment and the example utilizes a plurality of radial protrusions formed in the outer circumferential surface 62 of the bushing 6.

As can be seen in the figures, in the seventh embodiment, a large-diameter inner circumferential surface 216 is formed on the inner circumferential surface of the first lower column 21, across a specified length from the left end (lower side) of the first lower column 21, the same as in the first embodiment. An inner circumferential surface 211 is also formed adjacent to the right edge (upper side) of the large-diameter inner circumferential surface 216. The large-diameter inner circumferential surface 216 and the inner circumferential surface 211 are both a cylindrical shape, and the inner diameter dimensions of the inner circumferential surface 211 are formed smaller than the inner diameter dimensions of the large-diameter inner circumferential surface 216. The step section 214 is formed between the large-diameter inner circumferential surface 216 and the inner circumferential surface 211.

Figure 12:
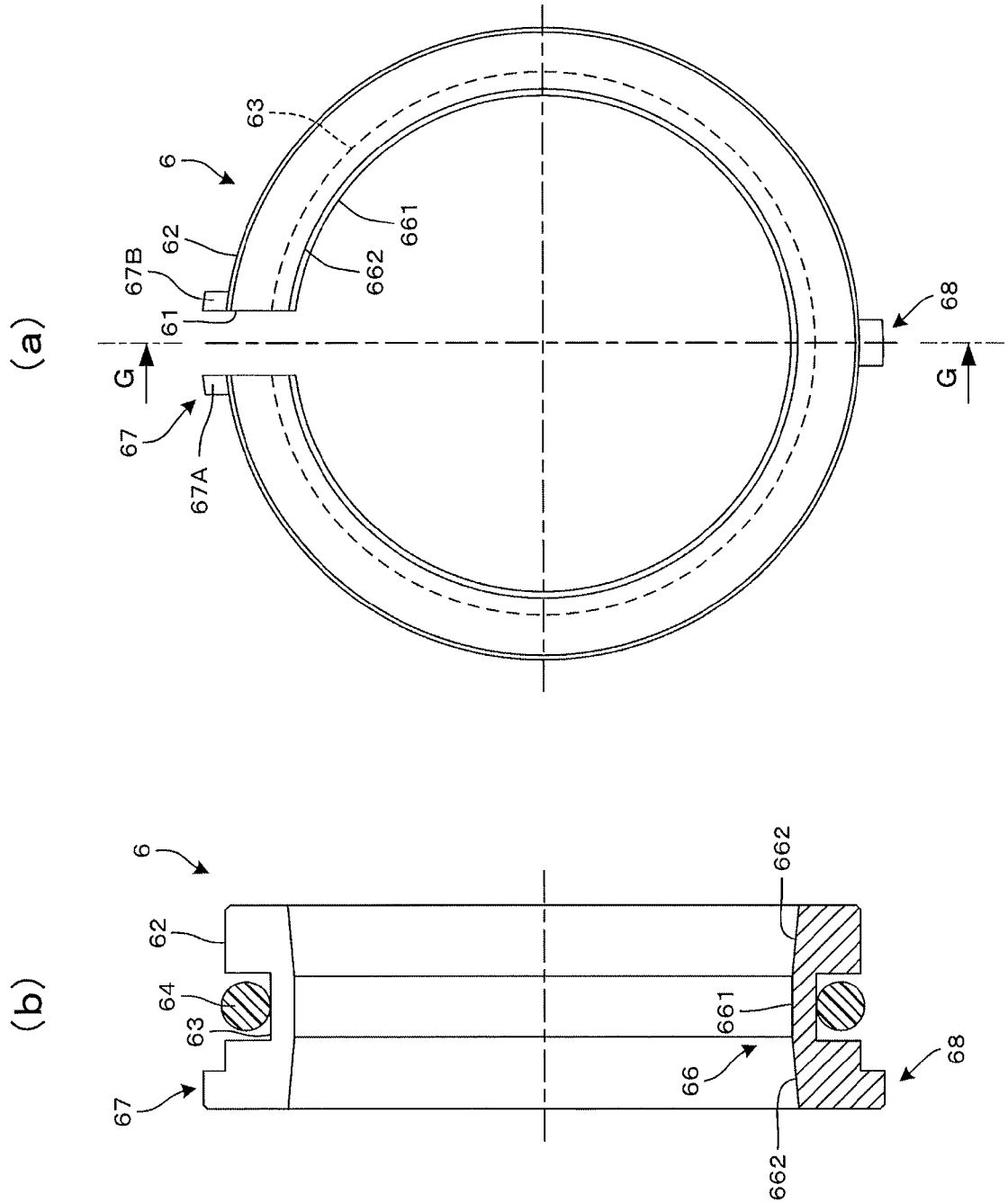
FIG. 12A is an enlarged frontal view showing the bushing of the seventh embodiment of the present invention.

On the outer circumferential surface 312 of the female steering shaft 31, the plastic bushing 6 shown in FIG. 12 is inserted between the spline latching section and the large-diameter inner circumferential surface 216 of the first lower column 21 as seen from an axial direction. As shown in FIG. 12, the bushing 6 is formed in a hollow tubular state, and one slit 64 is formed across the entire length along the axial direction.

The outer circumferential surface 62 of the bushing 6 of the seventh embodiment is formed to the same outer diameter dimensions along the entire length in the axial direction, and there is no annular flange 65 which is the same as in the second embodiment. An annular groove 63 is formed in the intermediate section along the axis (towards left and right in FIG. 12B) on the outer circumferential surface 62, and an O-ring (elastic member) 64 having a circular cross section is inserted into the annular groove 63. The O-ring 64 is made from an elastic material such as synthetic rubber.

In the seventh embodiment, the radial protrusions 67, 68 are formed at two positions on the outer circumferential surface 62 of the bushing 6. The radial protrusion 67 includes two radial studs 67A, 67B. These two radial studs 67A, 67B are formed facing opposite each other and enclosing the slit 61 along the circumference. The other radial protrusion 68 is formed at a different position that is 180 degrees relative to the radial protrusion 67.

Figure 11:
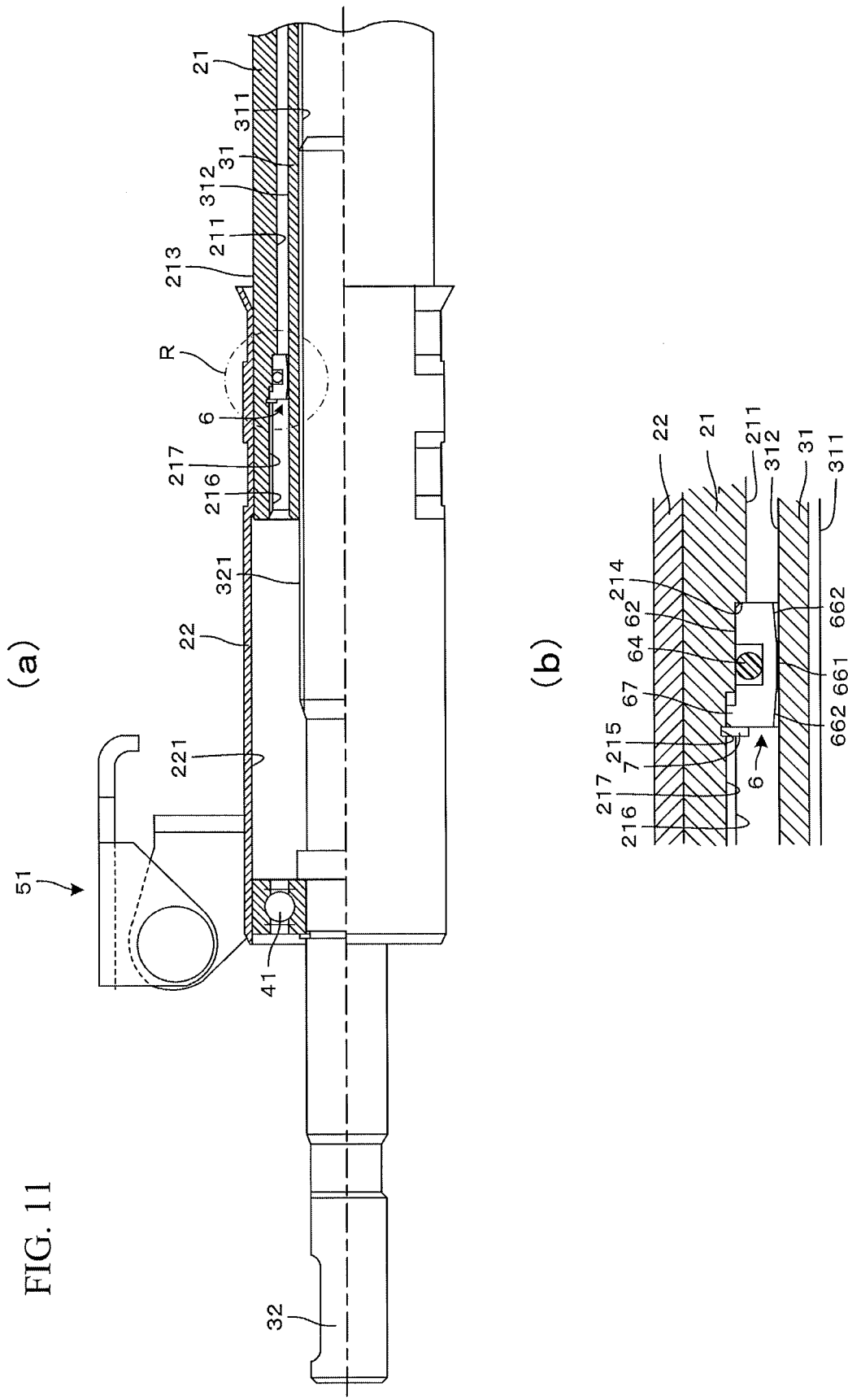
FIG. 11A is an enlarged cross sectional view showing the vicinity of the bushing of the seventh embodiment of the present invention.
FIG. 11B is an enlarged cross sectional view of the R section in FIG. 11A.

As can be seen in FIG. 11, latching grooves (FIG. 11 shows only a latching groove capable of latching the radial protrusions 67) 217, 217 for capable of latching the radial protrusions 67, 68 are formed on the large-diameter inner circumferential surface 216 of the first lower column 21. The latching grooves 217, 217 are formed towards the right edge from the left end (lower side) of the first lower column 21, and are formed somewhat shorter than the axial length of the large-diameter inner circumferential surface 216.

Inserting the bushing 6 into the large-diameter inner circumferential surface 216 of the first lower column 21, makes the radial protrusions 67, 68 latch with the latching grooves 217, 217. Inserting the bushing 6 with a now contracted diameter into the large-diameter inner circumferential surface 216 of the first lower column 21 causes one edge of the bushing 6 to make contact with the step section (See FIG. 11B) 214 formed on the inner circumference of the first lower column 21. The other edge of the bushing 6 makes contact with the stop ring 7 such as a C type stop ring or a C-ring that fits into the annular groove 215 formed in the large-diameter inner circumferential surface 216. Axial movement by the bushing 6 is consequently prevented and rotational movement by the bushing 6 relative to the first lower column 21 is also prevented.

The seventh embodiment of the present invention is capable of reliably preventing rotation by the bushing 6 relative to the first lower column 21 due to rotation by the female steering shaft 31 causing transmission of rotational torque from the female steering shaft 31 to the male steering shaft 32. The present embodiment can therefore prevent twisting of the bushing 6 due to fluctuations in the gap in the slit 61. The frictional force between the outer circumferential surface 312 of the female steering shaft 31 and the cylindrical surface 661 of the bushing 6 is consequently stabilized, and the handling stability of the steering wheel 103 during high-speed driving is enhanced.

Eighth Embodiment

Figure 13:
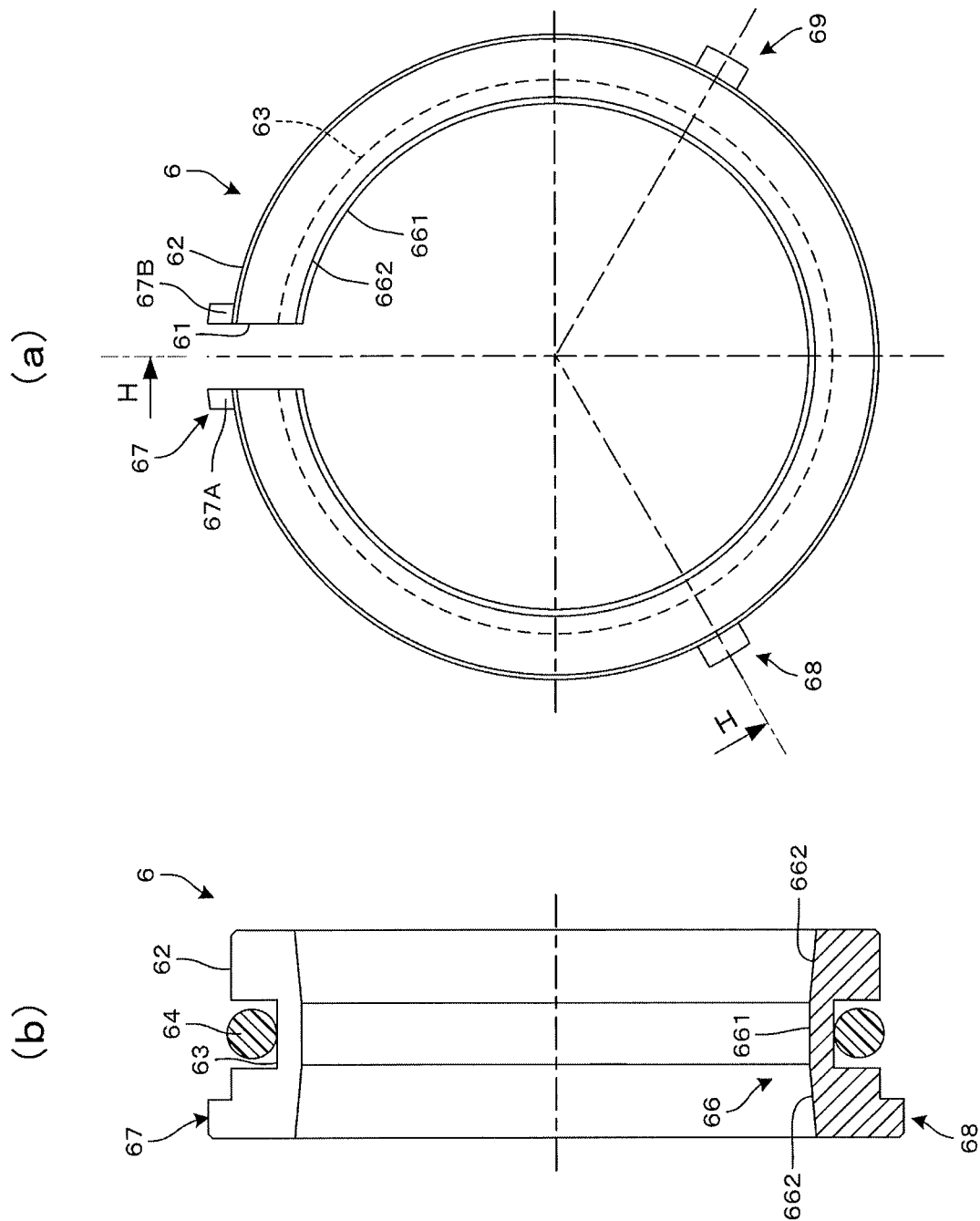
FIG. 13A is an enlarged frontal view showing the bushing of the eighth embodiment of the present invention.
FIG. 13B is a cross sectional view taken along lines H-H in FIG. 13A.

The eighth embodiment of the present invention is described next. FIG. 13A is an enlarged frontal view showing the bushing of the eighth embodiment of the present invention. FIG. 13B is a cross sectional view taken along lines H-H in FIG. 13A. In the following description, only those structural sections different from the above embodiment are described and a description of redundant sections is omitted. Moreover, in the following description the same reference numerals are assigned to the same parts. The eighth embodiment is a modification of the seventh embodiment, and the example utilizes three radial protrusions formed in the outer circumferential surface 62 of the bushing 6.

In the eighth embodiment, three radial protrusions 67, 68, 69 are formed on the outer circumferential surface 62 of the bushing 6. The radial protrusion 67 includes two radial studs 67A, 67B. These two radial studs 67A, 67B are formed at positions facing towards the periphery and enclosing the slit 61. The radial protrusion 69 is formed at a position different from the radial protrusion 67 by +120 degrees. The radial protrusion 68 is formed at a position different from the radial protrusion 67 by −120 degrees. Though not shown in the drawing, the latching grooves 217, 217, 217 capable of latching with the radial protrusions 67, 68, 69 are formed on the large-diameter inner circumferential surface 216 of the first lower column 21. These latching groove 217, 217, 217 are formed on the left end (lower side) of the first lower column 21, and are formed slightly shorter than the axial length of the large-diameter inner circumferential surface 216.

Inserting the bushing 6 into the large-diameter inner circumferential surface 216 of the first lower column 21, makes the radial protrusions 67, 68, 69 latch with the latching grooves 217, 217, 217. Inserting the bushing 6 with a now contracted diameter into the large-diameter inner circumferential surface 216 of the first lower column 21 causes one edge of the bushing 6 to make contact with the step section 214 formed on the inner circumference of the first lower column 21. The other edge of the bushing 6 makes contact with the stop ring 7 such as a C type stop ring or a C-ring that fits into the annular groove 215 formed in the large-diameter inner circumferential surface 215. Axial movement by the bushing 6 is consequently prevented and rotational movement by the bushing 6 relative to the first lower column 21 is also prevented.

The eighth embodiment of the present invention is capable of reliably preventing rotation by the bushing 6 relative to the first lower column 21 due to rotation by the female steering shaft 31 causing transmission of rotational torque from the female steering shaft to the male steering shaft 32. The present embodiment can therefore prevent twisting of the bushing 6 due to fluctuations in the gap in the slit 61. The frictional force between the outer circumferential surface 312 of the female steering shaft 31 and the cylindrical surface 661 of the bushing 6 is consequently stabilized, and the handling stability of the steering wheel 103 during high-speed driving is enhanced.

The above embodiment utilized a circular shaped O-ring 64 as the cross section. However, the present invention may also utilize an annular ring made from synthetic rubber whose cross section is X-shaped or is U-shaped. One slit 61 formed across the entire axial length was utilized in the bushing 6 in the above embodiment, however a slit shorter than the axial length of the bushing 6 may also be utilized at plural positions along the circumference.

The above embodiments were applied to a steering device whose upper column was the outer column; and whose lower column was the inner column. However, the present invention may also apply to a steering device whose upper column is the inner column; and whose lower column is the outer column.

The above embodiments were also applied to a steering device whose upper steering shaft was a female steering shaft; and whose lower steering shaft was a male steering shaft. However, the present invention may also apply to a steering device whose upper steering shaft is a male steering shaft; and whose lower steering shaft is a female steering shaft.

What is claimed is:

1. A steering device comprising:
   a first lower column;
   a second lower column, wherein an inner circumferential surface of the second lower column is secured to an outer circumferential surface of the first lower column by a caulking process;
   an upper column that engages with the first lower column by a relative sliding axial movement;
   a female steering shaft axially supported on an upper side of the upper column, and on which a steering wheel facing a rear of a vehicle is mounted;
   a male steering shaft axially supported on the second lower column to allow rotation by way of a rolling bearing installed on a lower side of the second lower column, and latching with the female steering shaft for movement along an axis relative to the female steering shaft and for transmitting rotational torque, and conveying rotation of the steering wheel to vehicle wheels;

a hollow cylindrical bushing with a slit formed along an entire axial length of the bushing and inserted between an inner circumferential surface of the first lower column and an outer circumferential surface of the female steering shaft; and an elastic member inserted between an outer circumferential surface of the bushing and the inner circumferential surface of the first lower column, and that applies a force to reduce a diameter of the bushing, and press an inner circumferential surface of the bushing towards the outer circumferential surface of the female steering shaft.

2. The steering device according to claim 1, further comprising:

a cylindrical surface formed on an intermediate section of the bushing along an axis of the bushing on the inner circumferential surface of the bushing and capable of making contact with the outer circumferential surface of the female steering shaft; and a tapered surface formed on each end of the intermediate section along the bushing axis on the inner circumferential surface of the bushing, wherein each tapered surface tapers obliquely from a respective end of the intermediate section along the bushing axis in a direction away from an axial center of the bushing, wherein the elastic member is mounted in the intermediate section along the bushing axis.

3. The steering device according to claim 2, wherein the bushing is mounted on the outer circumferential surface of the female steering shaft at a section for latching the male steering shaft to the female steering shaft.

4. The steering device according to claim 2, further comprising:

an annular flange formed on the outer circumferential surface of the bushing; and an annular groove formed on the inner circumferential surface of the first lower column, in which the annular flange inserts to prevent axial movement of the bushing.

5. The steering device according to claim 2, further comprising:

a large-diameter inner circumferential surface formed on the inner circumferential surface of the first lower column, and that is contained within the outer circumferential surface of the bushing;

a small-diameter inner circumferential surface formed on the inner circumferential surface of the first lower column on an upper side farther than the large-diameter inner circumferential surface;

a step section formed on a joint section joining the large-diameter inner circumferential surface and the small-diameter inner circumferential surface, and in direct contact with, a first edge surface of the bushing; and a stop ring in direct contact with a second edge surface of the bushing inserted into an annular groove formed on the large-diameter inner circumferential surface to prevent axial movement of the bushing.

6. The steering device according to claim 2, wherein the slit is formed obliquely from a right edge of the bushing and from a left edge of the bushing towards a center of the bushing.

7. The steering device according to claim 2, wherein the slit is formed obliquely from one edge of the bushing towards an other edge.

8. The steering device according to claim 2, wherein a rectangular protrusion and a rectangular cavity mutually latching with each other are formed at opposite facing locations enclosing the slit.

9. The steering device according to claim 2, wherein plural elastic members are mounted on separate positions along the bushing axis.

10. The steering device according to claim 2, further comprising:

a plurality of radial protrusions formed on the outer circumferential surface of the bushing; and a latching groove formed on the inner circumferential surface of the first lower column to latch with the radial protrusions in order to prevent the bushing from rotating relative to the first lower column.

11. The steering device according to claim 1, wherein the bushing is mounted on the outer circumferential surface of the female steering shaft at a section for latching the male steering shaft to the female steering shaft.

12. The steering device according to claim 1, further comprising:

an annular flange formed on the outer circumferential surface of the bushing; and an annular groove formed on the inner circumferential surface of the first lower column, in which the annular flange inserts to prevent axial movement of the bushing.

13. The steering device according to claim 1, further comprising:

a large-diameter inner circumferential surface formed on the inner circumferential surface of the first lower column, and that is contained within the outer circumferential surface of the bushing;

a small-diameter inner circumferential surface formed on the inner circumferential surface of the first lower column on an upper side farther than the large-diameter inner circumferential surface;

a step section formed on a joint section joining the large-diameter inner circumferential surface and the small-diameter inner circumferential surface, and in direct contact with, a first edge surface of the bushing; and a stop ring in direct contact with a second edge surface of the bushing inserted into an annular groove formed on the large-diameter inner circumferential surface to prevent axial movement of the bushing.

14. The steering device according to claim 1, wherein the slit is formed obliquely from a right edge of the bushing and from a left edge of the bushing towards a center of the bushing.

15. The steering device according to claim 1, wherein the slit is formed obliquely from one edge of the bushing towards an other edge.

16. The steering device according to claim 1, wherein a rectangular protrusion and a rectangular cavity mutually latching with each other are formed at opposite facing locations enclosing the slit.

17. The steering device according to claim 1, wherein plural elastic members are mounted on separate positions along an axis of the bushing.

18. The steering device according to claim 1, further comprising:

a plurality of radial protrusions formed on the outer circumferential surface of the bushing; and a latching groove formed on the inner circumferential surface of the first lower column to latch with the radial protrusions in order to prevent the bushing from rotating relative to the first lower column.

* * * * *